United States Patent Office 3,162,487
Patented Dec. 22, 1964

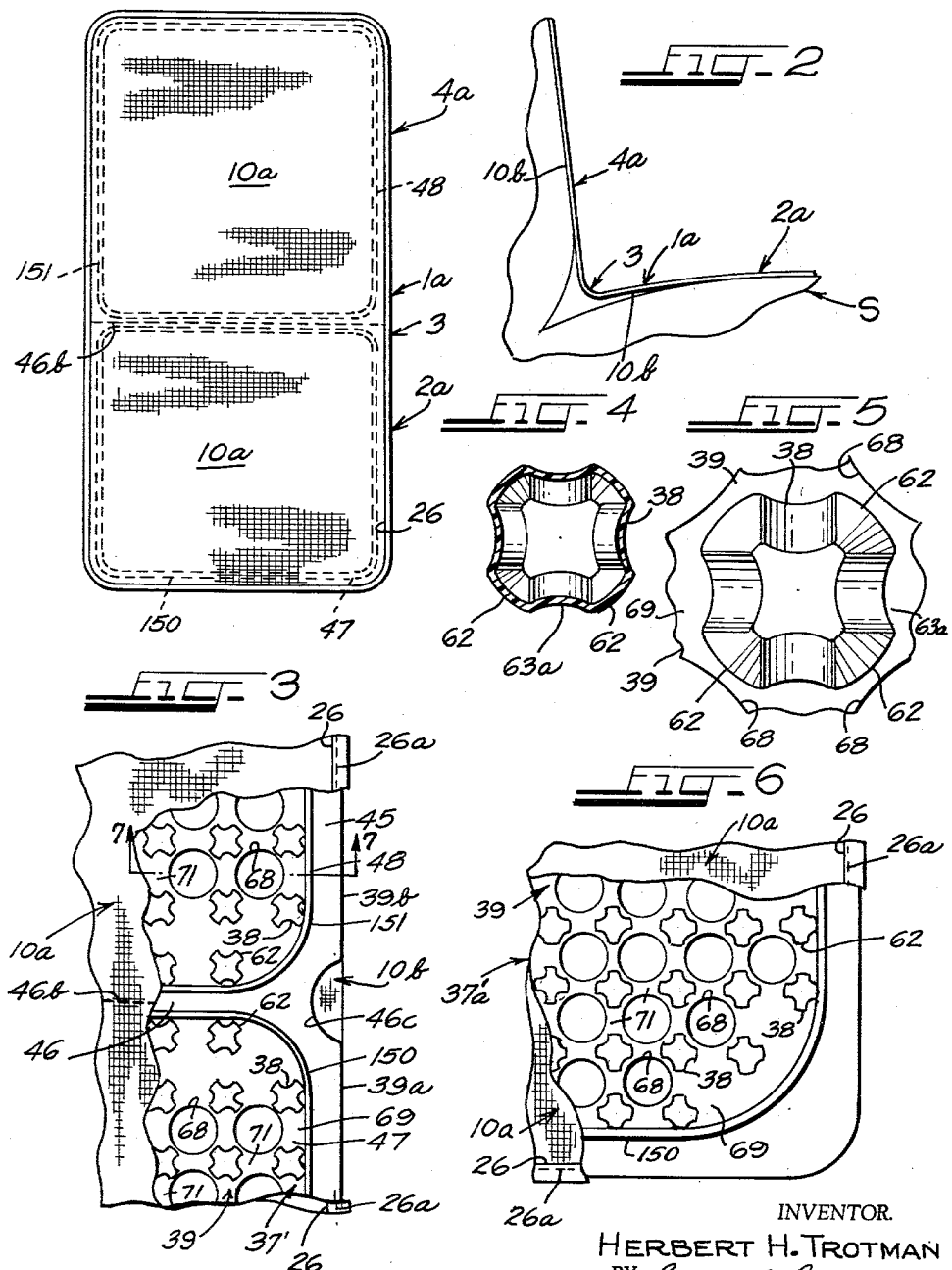

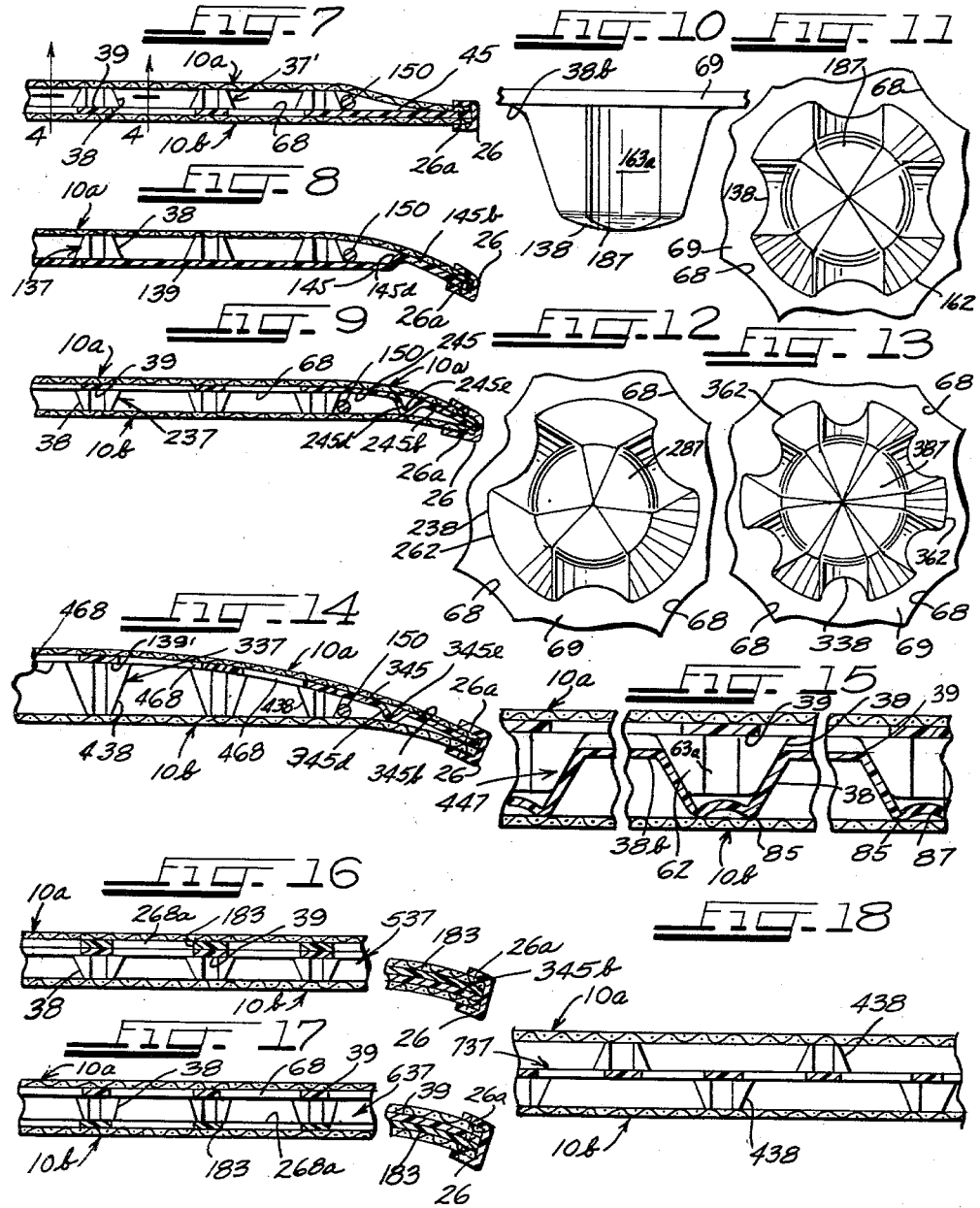

3,162,487
AIR-CARRYING FLEXIBLE LAYER FOR
UNDER-BODY VENTILATING
Herbert H. Trotman, Churchland, Va., assignor, by mesne assignments, to Phillips Petroleum Company
Filed Aug. 31, 1962, Ser. No. 220,612
21 Claims. (Cl. 297—453)

This invention relates broadly to improved body-spacing and air-carrying layers for use on cushioned surfaces and with forced or naturally-circulating air, and which are flexible but at the same time have a limited springy stiffness to hold them generally flat locally. It also relates to either free types or to tied-down or stretched-out types of under-body ventilating pads which include such layers and which support one or more persons and retain substantially the comfort of the under cushioned surface by an adequately free bending down of the pad and its flexible inner air-carrying layer into the cushioned surface under a person's weight.

More particularly, the present invention relates to such body-supporting and air-carrying layers comprising at least one thin plastic sheet having integral hollow body-supporting projections spaced apart (preferably in all directions) for air flow therebetween and for flexibility in conforming to the supported body, and especially to low cost such layers for use in either free-types or tied-down types of pads on automobile seats.

My two copending applications, filed of even date herewith, for "Hinged and Marginally Stiffened Under-Body Ventilating Pad," Serial No. 220,613, and for "Forced-Air Under-Body Ventilating Device," Serial No. 220,614, disclose and claim certain features and combinations usable with forms of this invention or disclosed herein, including, respectively (for said first application) hinge, marginal stiffening, and related means for the several pad parts and (for said second application) improved forced air-supplying and directing means and related features and combinations in pad devices of this general type. The disclosures of these two said applications are intended to be included herein by this reference, as are the disclosures of my (jointly with others) prior Patents Nos. 2,992,604 and 2,992,605.

In general, while the objects of the present invention include certain of the more general objects of my above-referred to applications and prior patents, they here relate more to the provision of an improved body-supporting and air-carrying flexible layer for use with the features of my said applications and prior patents and in other such pads or generally like devices for use on cushioned surfaces and more particularly for use on automobile seats.

Prior to this invention, the commercially known under-body ventilating pads for use on automobile seats had their air-carrying and body-supporting layer formed by different arrangements of rows of springy steel wire secured to and between closed rectangular edge-stiffening frames. Most of such pads have been of the free type. Up until now, such coil springs layers have been the lowest cost and best all-around devices available or known for such purposes. For these reasons, they have been used in very large numbers, despite certain serious disadvantages and inherent deficiencies, including rusting of the coil springs, abrading or cutting of the flexible covers by the coil springs, the sharp ends of such coiled wires and their sticking through the covers, the permanent collapse or flattening out of such coil springs, the difficulties of adequately securing such coil springs into a complete pad, the lack of comfort due to the lack of softness and the harshness of the coil springs or the high local stiffness or hardness of their turns of relatively fine wire, and other disadvantages as noted below or which are well known to those skilled in this art. Naturally, for many years there have been numerous attempts to provide such body-supporting layers which would be commercially acceptable and which would solve these problems, including proposals for sheets of plastic or other non-metallic materials either carrying or formed with integral body supports. Such prior proposals have not had any appreciable commercial acceptance. This is believed to be due to failure to appreciate or to solve the several and interrelated problems, particularly for automotive use and including generally cost of the formed, ready-to-use plastic sheet, comfort, durability, appearance of the complete pad in actual use, cost and ease of fabrication into a complete pad, and other difficulties, certain of which are noted in the following and more detailed description of this invention.

Accordingly, the general objects of the present invention are to provide highly commercially acceptable such body supports and ventilating layers which will adequately provide for the several interrelated problems and difficulties noted above.

The broader objects herein also relate to the provision of such an improved and low-cost body-spacing and air-flow-carrying layer comprising at least one sheet of a suitable plastic with improved forms of integral hollow projections formed and spaced apart not only for low resistence to air flow therebetween, but also for adequate comfort-providing flexibility of the sheet in its bending under a person, and with unitary projections and sheet being particularly adapted for low-cost mass-production and to be secured in place in complete pads by strong and low-cost sewing.

Other and more specific objects of this invention are to provide:

An improved combination of such a thin flexible plastic sheet having margins and one or more covers sewed in improved fashion to and through said margins.

Improved forms and arrangements of such integral hollow projections in such plastic sheets and, more particularly, stiffer and more collapse-resistant supporting projections having tapered side walls and a plurality of side wall ribs or buttresses.

Improved such sheets having air holes between the hollow projections, such holes serving to increase the two-way bendability of the sheet between said projections.

Improved arrangement of such integral hollow projections on at least one such sheet, including the all-directional spacing-apart of said projections and their arrangement in unit areas, with margins to allow for edge sewing, stiffening frames, and other purposes.

Outwardly tapering and improved forms of such integral hollow projections which facilitate their low-cost mass-production by pressure or vacuum-induced flow of a heat-softened thin sheet of suitable plastic over a one-side-only die plate; and, more particularly, improved forms of such integral projections which are of relatively uniform lateral dimensions and are three-dimensionally deformed from a thin sheet of suitable plastic to give a large amount of weight-carrying collapse resistance by the use of only a minimum weight of plastic for each unitary sheet.

An improved arrangement of such hollow integral projections on such a sheet, providing hinge means and a margin between hinged-together seat and back portions.

An improved such plastic sheet, with its integral hollow projections extending outwardly from one side only, that can be used either-face-up to support a human body and that will provide comfortable, smooth, relatively-soft and non-cloth-abrading or wearing body-contact areas on both sides.

Improved arrangements and forms of such integral hollow projections which will provide a springy return from collapse under heavy loads and which also may take a limited permanent set under highly excessive local loads, thus preventing further damage without destroying the usefulness of such a body-supporting and flexible layer.

Other and more detailed objects and advantages of this invention, including cooperating or related features or arrangements, are set forth in or will be apparent from the attached specification, drawings, and claims.

In the attached drawings:

FIGURE 1 is a partly-broken-away plan view looking down on the top face of an opened-out free-type pad according to this invention;

FIGURE 2 is a partly-broken-away side elevation showing such a pad in its normal ready-for-use position on a conventional cushioned automobile seat and seat-back;

FIGURE 3 is an enlarged scale but fragmentary view like FIGURE 1, showing one side of the hinge region with the top cover broken away to show the interior structure;

FIGURE 4 is an enlarged scale sectional view through one projection, taken on the line 4—4 of FIGURE 7;

FIGURE 5 is a top plan view of the projection of FIGURE 4;

FIGURE 6 is an enlarged scale but fragmentary view like FIGURE 1, showing a corner region thereof with the top cover broken away to show the interior structure;

FIGURE 7 is a section taken on the line 7—7 of FIGURE 3, but to an enlarged scale;

FIGURE 8 is a sectional view like FIGURE 7, but showing an arrangement thereof in which the bottom cover and the holes in the plastic sheet are eliminated and a modified marginal region is provided;

FIGURE 9 is also a sectional view like FIGURE 7, but showing another modification comprising the inversion of the plastic sheet of FIGURE 7 and a modified marginal region;

FIGURE 10 is a side elevational view to an enlarged scale of a modification of the projection form shown in FIGURES 1 to 9;

FIGURE 11 is a bottom plan view of the body-supporting projections of FIGURE 10;

FIGURE 12 is a plan view like FIGURE 10, but of another modification of the shape of the projections;

FIGURE 13 is a plan view like FIGURE 13, showing still another modification of the shape of the projections;

FIGURE 14 is a vertical section through a pad, showing a modified and tapering form and arrangement of the plastic sheet, its projections, and its margin;

FIGURE 15 is a vertical section through a pad, showing a modification which comprises the use of a plurality of embossed plastic sheets with their projections nested, the section being taken through holes 68a of the lower plastic sheet 39a and through the projections 38b of the upper plastic sheet 39b.

FIGURE 16 is a vertical sectional view like FIGURE 15, but showing another arrangement of two plastic sheets, one of which is flat and has holes matched to the holes of the other or projection-carrying plastic sheet;

FIGURE 17 is a view like FIGURE 16, showing an inversion of the projection-carrying sheet thereof; and FIGURE 18 is a sectional view to the same scale as FIGURE 15, showing a modification of the arrangement of the projections on the plastic sheet and a corresponding reduction in their size and in the diameter of the holes between them.

In the foregoing drawings and in their descriptions, for convenience in following this disclosure the same reference numerals are used in the differing arrangements of the several modifications for parts which are or may be otherwise essentially the same. In these modified forms, certain of the differing but generally similar parts are distinguished by the use of the same reference numerals increased by 100 in the succeeding modifications.

As indicated above, the more specific and generally preferred aspects of this invention relate to free-type non-installed or non-tied-down or stretched-out types of pad devices, as contrasted to tied-down or built-in types or the like. As used herein, the terms "free-type," "substantially non-tied-down" or the like are intended to define seat or seat and back pad devices requiring no particular installation and which need their own stiffening, but which may include well-known types of partial holding or locating means (such as a member, located at the rear of the pad or in back of the pad's hinge, to be forced in between the seat and back cushions, or hooks, clips, or the like to hold the back pad up), so long as such pad devices are not "built-in" or stretched out or flattened over the seat or back cushions, as by a stretched cushion cover, full seat cover, or the like. Similarly, this invention also relates to such devices for several people as well as types for only one person.

The features of this invention may be usefully employed in various forms or types of blower-forced-air or natural air circulation under-body ventilating pads or pad devices usually intended for use on cushioned surfaces (including beds, furniture and the like) and particularly for use on cushioned seats and backs of automotive vehicles. In general, such cushioned surfaces may be yieldable by a springy, padded, or otherwise deformable means.

A two-part hinged pad showing one form of this invention, designated as a whole by 1a, is shown opened out flat in FIGURE 1. The pads of this invention are particularly intended for use on a cushioned automobile seat and backs S. Thus the more specific aspects of this invention relate particularly to the problems arising out of or connected with convenient and comfortable use of such devices on automobile seats, truck seats, or the like.

Pad device 1a comprises the seat portion designated as a whole by 2a, the hinge area or portion designated as a whole by 3, and the back pad portion designated as a whole by 4a. Parts 2a and 4a may be considered either as two pads or as the two parts of one divided pad.

Pad 1a has thin flexible top and bottom covers 10a and 10b, respectively. At least the top cover 10a is foraminous for easy air flow or circulation therethrough. Usually the bottom cover is of the same type mesh as the top cover, for lower cost and also for air circulation up through the bottom of the pad in certain cases. For low cost, these covers are usually of relatively loose, coarse, or open mesh of plastic, textile or other types of threads or mono-filaments, suitable for such use, of adequate wear resistance and providing the desired comfort and appearance. Such loose mesh covers are difficult to hold firmly by economical sewing and particularly by a single line of low-cost stitching.

Covers 10a and 10b are desirably in one piece, extending across the hinge area 3 and out to all of the edges of pad 1a, where they are secured. These outer edges of covers 10a and 10b are embraced by a suitable edge binding or piping 26 to strengthen and conceal the raw edges. Desirably, this edging 26 is a bent-over strip of either a suitable plastic-surfaced cloth or a suitable very thin plastic sheet, both selected to grip and help lock the stitches 26a and also to grip the edges of all material embraced by this edging. The single line of stitching 26a (only one line being needed in the low-cost pad of this invention) is sewed through both sides of 26, through the edges of covers 10a and 10b, and also through the edges of the forced-air-carrying and body-supporting layer means designated as a whole by 37' and hereinafter described in more detail.

According to the present invention, the layer 37' has its own limited springy stiffness to hold itself generally flat locally. It is preferred that this layer 37' be made in accordance with one of the forms or arrangements of this invention disclosed below.

Such a layer 37' is relatively flexible or bendable down into a cushioned seat, back, or other supporting surface under a supported person. Thus in free-type pads it usually or normally needs some additional resilient stiffening adjacent its edges or margins to prevent undesired cupping or bowing of the pad or bending up of its edges, particularly as a permanent set remaining when the pad is unoccupied. However, due to its own limited springy stiffness, such a layer 37' does not need as heavy or as stiff an edge or marginal stiffening means as is the case for a wholly or substantially flexible layer, such as, for example, the conventionally-used layers of steel coil springs. The several forms of such marginal stiffening means or frames may be conventional. Preferably they are according to the disclosure of my above-referred-to application for "Hinged and Marginally-Stiffened Under-Body Ventilating Pad."

The air-carrying layer is designated as a whole by 37' in FIGURES 3 and 7; by 137 in FIGURE 8; by 237 in FIGURE 9; by 337 in FIGURE 14; by 447 in FIGURE 15; by 537 in FIGURE 16; by 637 in FIGURE 17; and by 737 in FIGURE 18. Component or detail parts which remain the same carry the same numerals.

For convenience in using the above-referenced disclosures, the reference numerals here are generally the same as those in my two above-referred-to applications, especially for the detailed or component parts.

As shown in FIGURES 1 through 7, layer 37' comprises the single thin sheet 39 formed according to this invention. This sheet 39 has a thickness in the range of from eight to twenty mils and preferably about fifteen mils, which is relatively uniform after forming. It uses but a small amount of a suitably strong non-brittle plastic which is discussed in more detail below. The integral hollow frusto-conical (preferably generally polygonal or with ribs) three-dimensionally-deformed and body-supporting projections 38 have generally flat outer ends of about one-half their base areas. Projections 38 are preferably rapidly mass-produced by flow or draping of a single sheet over the single die plate by vacuum-type forming. In this forming the wall thicknesses of the projections are but little reduced from the web thickness or from the original sheet thickness. Preferably, this thickness reduction is less than about one-third.

Further, sheet 39 with projections 38 has little (preferably less than ten percent) orientation or lock-in stress to be released in a sun-heated automobile. It is desirable that these upright supports 38 be of less than one-half inch in height, and they may be only about one-quarter inch when they are on only one face, to provide a very thin (about one-quarter inch thick) air-carrying layer 37' which will not have its thickness materially reduced in normal use. The projections preferably have their side walls sloped about as shown for best columnar stiffness and collapse resistance, and are corrugated to form tapering ribs or upright side-wall buttresses 62 as shown in FIGURE 4 (preferably at the polygonal corners), thus greatly increasing their body-supporting stiffness. Such ribs or butresses 62 supply a major part of the columnar stiffness and load-carrying ability of the projections.

For low resistance to the flow of forced or naturally circulating air in layer 37', supports 38 are spaced apart in all directions, as shown, and are proportioned so that their horizontal cross-sectional areas are in the range of from only one-tenth to a maximum of one-third, and preferably about one-eighth, of the body-supporting areas.

These projections 38 are integrally connected and prevented from tilting excessively by web or flat portions 69 which have a limited springy stiffness to locally hold layer 37' generally flat and yet provide sufficient springy flexibility for the unstiffened areas of pads 2a and 4a to permit relatively free or flexible curving down into the under cushion to provide comfort. This also prevents materially obstructing or changing the effective thickness of air flow by abrupt bends in layer 37'. Preferably, layer 37' or the whole pad has only one plastic sheet materially stressed by this bending, to avoid uncomfortable beam-type stiffness in the air-carrying structure.

In certain cases, holes 68 may be provided between projections 38 and spaced apart for relatively uniform distribution of forced air to a supported body. They are die-cut or punched through webs 69 between the supports 38, as shown. Holes 68, as shown, are preferably materially larger than the bases of the projections and have diameters nearly as large as the space between the projections. Circular holes 68 (here specifically of about 19/32" diameter) are preferred as being easier to die cut in mass-production. Other smoothly curved forms may be used.

Larger size holes, permitting their reduction in number, are preferred for economy in the punching operation. They provide a total air-carrying area in a range of from one-quarter to one-half, and preferably about one-third, of the body-supporting areas, to provide an adequately low resistance to natural air circulation or forced-air flow therethrough.

These holes also define or form strip-like or elongated members 71 extending between and connecting projections 38. Strips 71 are more flexible because they can deform by simple bending across their relatively narrow widths. They extend from side to side and from front to rear for bending under a person in these two directions. Strips 71 retain an adequate limited stiffness to hold sheet 39 generally flat locally, thus preventing abrupt bends or high air-flow-resistance portions in the air-carrying passage of thin layer 37'.

Supports 38 are arranged in a suitable two-way pattern in body-supporting area 47 of the seat pad portion 39a of one-piece sheet 39. As shown, this area is rectangular, with corners cut away to clear or prevent interference with the hereinafter-noted stiffening frames and their two-way lost-motion connections.

Similar area 48 of the pad part 39b of sheet 39 is spaced from area 47 to provide the flat and hinge-forming integral or common margin 46. This relatively narrow margin 46 bends in flexure for the hinge action. That is, sheet 39 has an integral flexure hinge whose bending is limited to a narrow area by the stiffening of sheet 39 on each side of the hinge, as by the omission of a row of holes on each side, as shown.

Areas 47 and 48 are also spaced in from the side and end edges of sheet 39 to provide peripheral margin 45 of about the same or slightly less width than hinge margin 46. Margin 45 provides a sufficiently smooth or unobstructed region or flat sheet face alongside of the straight sides of outermost projections of areas 47 and 48 to provide for the relative outward lost-motion travel of the frame sides in those areas or cases where such lost-motion is needed. This lost-motion is discussed below.

Layer 37' has been disclosed above as comprising the one-piece sheet 39 or as having its seat pad portion 39a integral with its back pad portion 39b for lower cost in a pad having hinged seat and back portions. It also provides a stronger hinge structure for such a pad. However, it will be apparent to those skilled in this art that a pad portion such as 39a or 39b of any form of the invention may be a separate piece for use as a seat or back portion. Such an arrangement is disclosed in my above-referred-to application for "Hinged and Marginally Stiffened Under-Body Ventilating Pad."

Suitable widths of non-hinged embossed plastic sheets according to this invention may be used for the full widths of automobile seats or backs, such as, for example, parts of seat covers or on a tied-down form of pad. Also, they may be used on home or other upholstered and cushioned furniture. In most of such cases it is desirable to have a margin like 45 about the entire periphery of each such plastic sheet.

Turning now to more specific aspects of the projection-carrying sheets of this invention, it is to be noted that they are preferably of a suitably strong springy and non-metallic material of adequately low-cost. Various plastics are suitable, as will be apparent to those skilled in such arts. High-strength types of polyvinyl are satisfactory.

High-density types of polyethylene are preferred at present.

As noted above, the locked-in stresses or orientation from the forming should be materially less than 10% for plastics and for forming processes where such orientation may occur, so as to withstand temperatures in the order of 200° F. This limitation of such locked-in stresses or orientation avoids undesirable subsequent changes in shape during normal use when closed automobiles parked in the summer sun may reach interior temperatures of this height.

While the projections (such as 38) may be formed in various known ways, the above-noted vacuum type or drape forming is preferred because of the materially lower tooling costs resulting from the cheaper single die plate, which may be a single flat plate or of a cylindrical rotary type, as well known in this art. An additional saving in the manufacturing cost of the formed plastic sheets may be achieved by using a continuous film or sheet direct from the extruder.

The plastic sheet (such as 39) used in this invention (and particularly its marginal portion (such as 45 or 46) locks the stitches of ordinary sewing, since the preferred plastic springs back in after being perforated by the usual needle, and tightly grips the thread. The thickness and other properties of the preferred plastic sheets permit rapid and low-cost sewing by conventional factory sewing machines. These desirable features provide important advantages of this invention. However, it is to be understood that other materials than a sheet of plain plastic, and other processes for forming the integral hollow body supports, may be used within the broader aspects of this invention. For example, conventional molding between male or female or matched dies may be used in certain cases. Similarly, the sheet may be of plastic reinforced with fibers, or it may be a sheet of fibers (such as paper) treated with plastic and forced into shape by dies and high pressure.

For best collapse resistance, the side walls of projections 38 taper or are sloped in the order of from nearly vertical, or 16 to 1, down to a slope of about 5 to 1, to retain relatively upright and columnar type walls and ribs. The projections are truncated so that their smaller outer ends have areas in the range of from one-third to two-thirds of the areas of their larger ends. Thus, the dimension across the hollow larger base of each projection is materially larger than its height, or in the order of 3 to 2 for the preferred one-quarter inch height. The smaller ends are slightly less in dimension across than the heights.

Considering the general form of the projections or supports such as 38, it is to be noted that they have hollow bases which are materially wider in both or all directions than their preferably closed and smooth upper or truncated ends. This arrangement provides an economical anti-tilt base mounting for each projection. The taper of the projections not only facilitates their removal from the normally-used male elements of the preferred single die plate or cylinder, but also provides a stronger and more collapse-resistant columnar support by reason of the sloped side walls and their sloped ribs. Furthermore, finished sheets (such as 39) may be bundled and shipped in tightly nested stacks. Such nesting is also shown in the heavier-duty type pad arrangement of FIGURE 15.

It is preferred (but is not essential in all aspects of this invention) that the hollow supports each not only have a high load-carrying ability (to permit a lower-cost formed sheet), but also have a material springy action under high loads, together with a limited and only partial permanent deformation under high excess local loads. Such high excess local loads may, for example, be like those produced by a child jumping with his heels on a sheet 39 when the sheet is on a rigid surface.

The above-noted springy yielding under load may be increased (with a reduction in the maximum load-carrying ability) by increasing the slope of the nearly-upright side walls and their ribs. This may be desirable for a softer feel in certain applications. Also, it is to be understood that pads according to this invention may include a suitability porous layer of springy padding material under the top cover or over the top of a sheet such as 39.

The base of each support is illustrated (as in FIGURE 10) as having a relatively sharp bend or radius of curvature at 38b where its side walls join the integral web portions 69. This increases the column strength and also provides more room for the holes 68. A gradual or wider bend at 38b may be desired in some cases (particularly where holes 68 are not used) to increase the springy yielding of the supports. However, any large amount of springy yielding under normal body loads would unduly reduce the thickness of the air flow-carrying layer such as 37', and is not necessary in most cases where the pad is used on an under cushion which is adequately yieldable or soft and which provides the desired comfort.

To retain the comfort of the under cushion, it is generally desirable to avoid arrangements that materially increase the pad stiffness, as by giving a beam-like structure or action. Thus, while multiple layers of plastic sheets are shown in FIGURES 15, 16, and 17, these sheets are not interconnected (to act as beams) except at their margins.

Turning back to the several forms shown in the drawings, it will be noted that FIGURES 1 to 7, inclusive, show the projections on the top, so that their smaller ends support the person's body. The smaller ends have areas adequate and closely enough spaced to provide comfort in this arrangement. Holes 68 are provided here. In certain cases of non-forced-air pads, these holes permit air flow up from underneath the pad.

In FIGURE 3, the corners or ribs of the generally-rectangular-cross-section supports 38 are shown as arranged between the holes 68. In this case, the sides of these same supports 38 are parallel to the sides and ends of sheet 39.

In order to increase the room available for holes 68 or to facilitate the operation of punching or cutting them (by two matched cutting members), the projections 38 may be arranged as shown in the layer 37'a of FIGURE 6, with the narrower dimension between their sides aligned between holes 68. Thus, FIGURE 6 shows the projections turned 45° from their arrangement in FIGURE 3.

FIGURE 8 shows the layer 137 as comprising plastic sheet 139, which may be just like sheet 39 except that holes 68 are omitted.

As shown in FIGURE 9, the sheet 39 of FIGURE 7 may be inverted and used with its projections 38 on its under face. This arrangement is desirable, since the larger body-supporting areas including the connecting strips 71 provide greater comfort. In arrangements like FIGURES 7 and 9, it is desirable to use in place of 10b an impervious bottom cover for forced-air-type pads.

FIGURES 10 and 13 are discussed in more detail below in connection with FIGURES 4 and 5 and the several different shapes for the supports.

The modifications of the margins of FIGURES 7, 8, 9, and 14 are discussed below after the discussion of the marginal stiffening frames 150 and 151 and their lost-motion connections.

As shown in the layer 337 of FIGURE 14, the holes 468 and the projections 438 need not be of uniform height or size. In this figure, the projections may, as shown, be tapered down in height adjacent a margin 345 or the margin at the hinge to provide better comfort and appearance by a smoothly and progressively-decreasing pad thickness in regions along all or certain of its edges. It will be appreciated that sheet 139' of FIG- URE 14 may have its margin formed for use with projections 438 on top.

In this form of FIGURE 14, the shorter height projections are proportionally reduced in their other dimensions. Similarly, the spacing between them, and the diameter of the holes 468 are shown as being proportionately reduced.

For heavy-duty use, such as by truck or cab drivers, it is desirable to provide layer 37 in a materially stronger form. It is also desirable in such cases to be able to use the same tooling and parts as used for regular and lighter-duty passenger automobile pads. For heavy-duty use, a plurality of plastic sheets may be used in different arrangements, of which certain ones are shown in FIGURES 15, 16, and 17. It is to be noted that these several layers of plastic sheets are preferably not materially interconnected, in order to avoid any combined action or beam effect. They are here intended to be connected only at their edges. This will have relatively little effect on their bending stiffness. Thus the increase in stiffness here is very close to the sum of the stiffnesses of the several plastic sheets.

As shown in FIGURE 15, two or more sheets 39 may be used with their tampering hollow projections 38 nested together as shown. In FIGURE 15, the projections 38 are shown as on the bottom of each sheet. They may be on top, i.e., the arrangement of FIGURE 15 may be inverted.

As shown in FIGURE 16, sheet 39 may be reinforced by a flat sheet such as 183 on top of sheet 39. As shown sheet 183 has holes 268a, which are shown as the same as holes 68 so that they can cut by the same tooling. These holes 268a are vertically aligned with holes 68 for upward air flow to the supported person.

FIGURE 17 shows an arrangment like FIGURE 16, with sheet 183 on the bottom.

Within the broader aspects of this invention, the hollow integral supports need not be on only one face of the plastic sheet. As shown by supports 438 in FIGURE 18, they can be formed on both sides by various well-known forming methods. These methods may include the above-referred-to drape forming on a single die plate, or the use of alternate male and female die elements for the alternate and oppositely-facing projections 438.

In all of the arrangements according to this invention, the hollow projections are preferably of generally the same dimensions in different directions across their horizontal cross section, or with their width and length about the same. Their shapes are not limited to the four-sided of four-ribbed forms shown in FIGURES 3 to 11. The projections may be of other shapes or forms.

For example, they may be generally three-sided, or with three ribs or lobes, as shown by the projection 238 of FIGURE 12. In this case, and due to the lesser number of ribs and the greater peripheral space available, the depth of the ribs 262 (for a similar size of projection) would be materially greater than in FIGURES 3 and 4. In general, the number and depth of the ribs (from the outermost portion of the rib to its adjacent valley) are limited as a practical matter only by the forming techniques employed.

As shown by projection 338 of FIGURE 13, a desirable generally hexagonal form may be used, with the six ribs 362 merging into and across the convexly-domed smaller end 387.

For convenience in machining the dies and for ease of molding, the rib tops are shown in all figures as being generally flat or only slightly curved. Also, the valleys or grooves 63a are shown as non-tapered (or with parallel sides) in their lower portions, so that the ribs 62 have all of the taper along the sides. It will be understood that other rib and groove profiles or arrangements may be used and the ribs made materially sharper or deeper, all within the scope of this invention.

As shown in more detail by the projections 38 of FIGURES 4, 5, and 15, the ribs 62 end at the smaller or outer (and preferably closed) ends of the projections, at the rim or annular top rib 85. This rim rib 85 extends around the periphery of the slightly concave top face 87. If desired, this top face may be generally flat.

However, greater support strength and stiffness is given by having the smaller ends at least slightly convex or domed and merging or curving smoothly into the side walls, as shown by end 187 in FIGURES 10 and 11, and also as shown in FIGURES 12 and 13.

In such a case the ribs such as 162 of FIGURES 10 and 11 are not truncated at their tops (as are ribs 62) and do not end at a rim rib like 85. Instead, the valleys 163a and the ribs or buttresses 162 curve smoothly over and taper down to, or close to, an apex located near the center of the convex or domed outer end 187 of FIGURES 10 and 11. The ribs 262 of FIGURE 12 and 362 of FIGURE 13 are similarly formed.

As noted above, it is usually desirable to provide a suitable edge or marginal stiffening means for free types of pads under this invention.

Various known or suitable marginal stiffening means may be used about all or parts of one or both of areas 47 and 48. Preferably (but not necessarily) such stiffening means are in accordance with the disclosures of my above-referred-to application for "Hinged and Marginally-Stiffened Under-Body Ventilating Pad." Only certain of such disclosures are illustrated or mentioned here, for the sake of brevity. To use the most extreme case (or the case wherein the lost-motion for the marginal stiffening means is most needed), the present application specifically shows and discusses only the one form of the two closed rectangular marginal stiffening frames for the one-piece plastic sheet from my above-referred-to application. It is to be understood, however, that various other forms of hinges and marginal stiffening means or frames (including the several other forms of my second above-referred-to application) may be used in free-type seat pads or where needed.

It is to be noted that the springy steel wire, as referred to herein for the stiffening frames, is intended to refer to the usual low-cost and non-tempered steel now ordinarily used for such frames in the coil spring types of seat pads.

In general, there will be at least two opposite sides of a frame or the like which are relatively rigidly spaced or held apart by a frame side and thus, when sheet 39 is curved down under a supported person, pulling its sides in, would highly tension sheet 39 (and its connecting stitches) if sheet 39 were directly connected or sewed to such opposite frame sides. Lost-motion means are provided to prevent resulting possible tearing, or in any case undesirable stressing, of thin plastic sheet 39 and of the stitches. In the cases illustrated here, where one of the outer edge-sewn flexible covers for pad 1a also provides the means to hold the stiffening frame intermediate the heights of the projections 38, this same lost-motion means may also permit the use of a low-cost single line of relatively untensioned stitches connecting sheet 39 to its outer cover or covers.

In the several figures of this invention, there are closed four-sided frames 150 and 151 which are rectangular with rounded or cut-off corners. They have a limited springy bending under a person. If desired, frames 150 and/or 151 may slightly compress the plastic sheet from front to rear, from side to side, or both ways. As shown, and when pad 1a is unoccupied, frames 150 and 151 may engage a face of margins 45 and 46 around the projections to limit their relative motion in that direction. Suitable means are provided to normally hold the frame sides generally intermediate the heights of marginal projections 38 or to hold them in the other direction transverse to sheet 39.

The frames 150 and 151 have a lost-motion-type connection to sheet 39 and for relative lost-motion travel generally along or in the plane of sheet 39. The inward direction of this lost-motion travel is limited by the normal (or unoccupied pad condition) engagement of frames 150 and 151 with marginal projections 38.

Sheet 39 has or carries suitable means, located out near its outermost edges, to limit the other direction of lost-motion travel and thus hold the frames and the sheet 39 together or in operative relation in a complete pad. The sewing of preferably all edges of sheet 39 to at least one outer flexible pad cover (either the top or bottom cover, whichever is on the same face as the projections and the frames) into the edging 26 by the single line of stitches 26a (with the stitches locked as disclosed above) performs two functions. First, this low cost and simple construction holds the said flexible outer cover generally in against the marginal projections 38 so that this said flexible outer cover prevents removal of the frames 150 or 151 outwardly from sheet 39. Second, the held-down portion of this said flexible cover inward from stitches 26a (or, indirectly, the line of stitches 26a itself) serves to limit the outward lost-motion travel of the frame sides relative to the sheet 39 or its projections 38.

An adequate effective amount of such lost-motion travel (of preferably from at least about one-eighth to one-quarter inch for the above-noted particular size pad 1a) is provided on each side of pad 1a for frames 150 and 151 and side-to-side curving down sheet 39. However, the several figures here show preferred and lower cost forms in which all (or substantially all) of the lost-motion travel required for the other direction of pad bending (or from front to rear of pad 2a and from top to bottom of pad 4a) is located at the outer ends or in or along the front margin 45 of sheet part 39a and in the top margin 45 of sheet part 39b. This arrangement provides an improved hinge structure wherein the single line of stitches 46b (as shown in FIGURE 1) is relatively quite close to (and between) the adjacent hinge sides of frames 150 and 151 to reduce or eliminate lost-motion travel adjacent the hinge and thus not interfere with the desired action of this flexure hinge. Preferably, there is at least as much total lost-motion travel provided at the outer pad ends as disclosed above for the two side lost-motion clearances. The slight bending of frame 150 or frame 151 from front to rear in use helps reduce the amount of lost-motion travel needed for front to rear bending.

Since both these lost-motions are determined in part by the margin width, it is important that the margins, and particularly 45, be of an adequate width, materially greater than the support base width or the hole diameters, and preferably greater than the projection-to-projection interval, as shown.

Interference at the corners of projection areas 47 and 48 (which would tend to hinder lost-motion travel in both directions) is prevented here by an outward clearance of the frames from the projections at these corners.

As best shown in FIGURE 3 (in which a portion of the top cover 10b and the binding 26 are broken away), under this invention plastic sheets which are in one piece for seat and back portions (or which have an integral flexure hinge portion like 46) preferably have smoothly notched-in sides at the ends of hinge portion 46, a shown at 46c, to reduce edge stresses and prevent tearing due to the hinge action.

It may be noted again that the plastic sheet (such as 39) has stiffened regions on either side of its unitary flexure-spring-forming hinge margin 46, or on either outer side of the frame sides at the hinge. This causes the bending to occur mainly in the hinge portion of the plastic sheet 39, especially between the hinge sides of the two frames 150 and 151. This action cooperates with the above-described absence of lost-motion adjacent the hinge. This absence of lost-motion avoids permanent deformation of the plastic sheet in the region adjacent the hinge.

It is desirable in free types of such pad devices (especially for use on automobile seats or the like), and where no other means is provided to hold the seat back pad part 4a up in place, to have the top cover or covers (including the porous cover) slightly looser or less tensioned from end to end of the entire pad than the air-carrying layer (such as the plastic sheet 39) and/or the back covers.

Thus the slight relative tensioning of the air-carrying layer or sheet (such as 39) or the slighting tensioning of its back cover 10b helps hold the hinged back pad part 4a up in place or against falling forward when unoccupied. However, it is usually desirable to otherwise connect the several flexible covers slightly loosely to the edges of the plastic sheet, especially from side to side.

In the nested arrangement of FIGURE 15 (in which either face may be up) the two plastic sheets normally will be slightly spaced apart because of the wall thicknesses of the nested tapered projections. This slight separation provides a thicker air-carrying layer. However, it also provides a very desirable frictionally-damped and resilient action under high loads. As one nested projection is forced farther into the projection into which it is nested, there is a material frictional rubbing between them. More important, there will be a resilient enlargement or stretching of the outer projection, with a corresponding hoop or band type compression around the sides of the inner projection. This resilient action will have a rapidly increasing spring rate.

As indicated above, the several nested plastic sheets are sewed or otherwise secured together at their margins (as by stitching 26a) and the stiffening frames held on the projection-carrying face of the lowermost sheet 39 of FIGURE 15 by any of the means disclosed above.

It is to be noted that the smaller height projections of FIGURE 18 are shown as proportionately reduced in all of their other dimensions. The spacing between them and the holes 268 are also proportionately reduced.

It will be noted that FIGURES 8, 9, and 14 also show several examples of modified margins which may be used in the plastic sheets of this invention.

As shown in FIGURE 8, the margin 145 (like 45 about the entire periphery of pad 1a) has its outer edge portion 145b turned or curved down. This is also true of FIGURES 9 and 14. The arrangement is desirable in keeping the edges of a free-type pad (such as 1a) flat on a seat or seat back and in preventing the curling up of such edges. The upright or substantially vertical wall 145d reinforces or stiffens the margin 145. Further, wall 145d may serve as the outer and lateral stop to engage frame 150 in the lost motion described above and in my above-referred-to application for "Hinged and Marginally-Stiffened Under-Body Ventilating Pad." This wall 145d forms a wide rib. It curves smoothly over into the generally flat or only slightly curved flange or rim portion 145b which, when not carrying a load, extends down materially below the bottom of sheet 39.

As shown in FIGURE 9, a generally similar marginal wall or rib structure may be provided where the plastic sheet has its projections on its lower face. In this FIGURE 9, the margin 245 is shown as including the end stop or lost-motion-limiting wall 245d (like 145d) which forms part of margin stiffening rib 245e and is outwardly bounded by the downwardly-extending flange portion 245b which (like 145b) extends below the bottom plane of the plastic sheet when it is not in use.

FIGURE 14 shows a margin 345 with rib 345e and flange 345b, all generally like those of FIGURE 9 except that flange 345b is less sharply curved down.

In each of these cases of marginal ribs or the like, the entire margin may, as shown, be made suitably wider than margin 45 to provide adequate room for the above-noted lost-motion travel. Also, while such ribs or the like extend in continuous form around the entire pad for simplicity of forming and for greater stiffness, yet they may, if desired, be provided by a number of shorter or interrupted ribs. Also, a plurality of parallel ribs may be used.

The flat or non-ribbed margins 45 of FIGURE 4 may be used with the projections up or down. In non-forced-air pads, this form provides for the entry of air to the spaces between the projections from the pad edges and over or along such margins. A similar effect may be had if the marginal ribs are interrupted.

In cases where the above-noted lost-motion travel is not needed, the stiffening frames (such as 150 or 151, or other forms thereof) may be closely received or tightly engaged on each side by projections (such as 38) and a rib wall (such as 145d). Thus the frame may be in a narrow valley or groove between adjacent ribs or between a rib and the projections.

Since (as noted above), it is desirable not to have lost-motion travel for the frames in or adjacent hinge area 46, such a tighter-fitting groove for the frame may desirably be used on each side of hinge portion 46. This reduces the load on stitches 46b, just as the rib or frame-engaging wall of margins 145 or 245 reduces the stress on stitches 26a.

Such arrangements cooperate with the above-noted locking of the stitches in the plastic sheet (such as 39) to provide for stronger and lower-cost sewing in such a pad.

While the spacing between the projections from side to side is shown as equal to the spacing from end to end, such spacings may be different within the broader scope of this invention. Similarly, the projections may be somewhat elongated in one of their horizontal dimensions as long as they are materially three-dimensionally deformed or avoid simple bending in their stressing under load.

The plastic sheets with projections on only one side according to this invention can be used with either side up. The smaller ends of the projections are preferably closed and provide adequate supporting areas together with a low resistance to the lateral flow of air between them. The three-dimensionally deformed projections can take a small permanent set under high excess local loads to prevent further damage, leaving the plastic sheet but little impaired and in usable condition.

The domed smaller ends of the projections of FIGURES 10 to 13 have much more springy yieldability than the nearly vertical side walls. Thus, these springy ends increase the surface softness and comfort of the pad and can take the place of, or usefully cooperate with, the above-mentioned soft springy porous layer over the sheet 39 and under the top cover.

It will be appreciated that the thicknesses of sheets or like portions (such as the covers 10a and 10b, the plastic sheet 39, or the like, and the edge binding 26) are necessarily exaggerated in the drawings in order to show thickness by double lines. Thus, the relative sizes or proportions of certain parts are distorted. As will be readily understood by those skilled in this art, even though the binding 26 embraces the margin of the plastic sheet and one or more covers, yet its total thickness will be much less than the thickness of sheet 39 with its projections 38 (which, as shown, is actually about one-quarter inch).

While only certain of the numerous possible forms and arrangements contemplated by this invention are specifically described in the foregoing specification or by reference to my above-referred-to prior patents and copending applications, it is to be understood that this invention may include, and it is intended to cover by the appended claims, various other forms or arrangements including the use of features hereof in other relations, all within the teachings and spirit of this invention.

I claim:

1. A flexible under-body ventilating pad for use on cushioned surfaces, comprising a thin sheet of suitably non-brittle and strong plastic shaped to support at least one person, said sheet having hollow columnar projections three-dimensionally deformed from said sheet for rigidity, with their outer ends coplanar and integral therewith, said projections being spaced apart in all directions by substantially more than the dimensions across their larger ends to permit substantially unobstructed flow of air therebetween and against the supported human body, said projections being interconnected in different directions, spaced and held against excess tilting by integral web portions of said sheet, said web portions being sufficiently bendable between said relatively rigid projections to flexibly conform to a supported person and with the deformations of a yieldable under cushion but having a limited rigidity to normally hold said sheet substantially flat.

2. The pad of claim 1, in which
said projections extend up from only one face of said sheet to support the person's body on their smaller ends, with said flexible interconnecting portions being adapted to rest on a yieldably cushioned seat, and in which
said sheet is substantially imperforate.

3. The pad of claim 1, in which
said projections extend up from only one face of said sheet to support the person's body on their smaller ends, with said flexible interconnecting portions being adapted to rest on a yieldably cushioned seat, and
said sheet has spaced holes therethrough and between said projections for access of air to the person's body, said holes totaling from about one-quarter to one-half of the supporting area of the sheet and each said hole being materially larger than the larger ends of said projections.

4. The pad of claim 1, in which
said projections extend downwardly from only the under face of said sheet with said flexible interconnecting portions forming larger area body supports and with said smaller areas of the smaller lower ends of said projections being closed and adapted to rest on a yieldably cushioned seat,
said sheet has holes therethrough between said projections to supply air to the supported body, and
the open larger ends of said hollow projections also provide open areas for access of air to the supported human body.

5. The pad of claim 1, in which
said projections extend alternately from opposite faces of said sheet.

6. A thin sheet of plastic of limited stiffness for use as a flexible under-body ventilating pad with cushioned surfaces, said sheet having
hollow columnar projections to spacedly support a human body,
said projections being spaced apart by substantially more than the dimensions across their larger ends to permit substantially unobstructed flow of air therebetween and against the supported body,
said projections being integrally interconnected and held against excess tilting by web portions of said same sheet between their larger ends, and
openings between said interconnecting portions forming elongated strips normally holding the sheet generally flat but deformable in simple bending transverse to their lengths between said projections to increase their flexibility and the flexibility and comfort of the pad under a supported person and to permit the pad to deform with a supporting cushion, said openings comprising only one hole between adjacent projections.

7. A flexible under-body ventilating pad for use on cushioned surfaces, comprising
at least one sheet of thin substantially-uniform-thickness plastic of limited springy stiffness to normally hold itself generally flat, said sheet having upright supports extending out from at least one face over an area shaped to support at least one human body and materially spaced apart in all directions by at least their greatest cross-sectional dimension for relatively free air flow therebetween and to a supported human body by flat connecting sheet portions which are relatively flexibly bendable down into a cushioned surface under a supported body and said plastic sheet having integral support-free margins about its free edges and about said area of supports, said margins being wider than the spacing between said supports and free of said supports.

8. A flexible under-body ventilating pad for use on cushioned surfaces, comprising at least one sheet of thin substantially-uniform-thickness plastic of limited springy stiffness to normally hold itself generally flat, said sheet having upright hollow plastic supports extending out from at least one face over an area shaped to support at least one human body, and materially spaced apart in all directions for relatively free air flow therebetween and to a supported human body by flat connecting sheet portions, said plastic sheet having integral margins free of said supports about said area of said supports, the plastic of said sheet resiliently springing back in when perforated, a foraminous cover over said sheet, and sewing through said cover and the margin of said sheet, the stitches of said sewing being gripped by the plastic material in its said thin sheet form to materially strengthen said sewing.

9. A flexible under-body ventilating pad portion for use on automobile seats comprising a thin sheet of suitably nonbrittle and strong plastic of from eight to twenty mils in thickness and of limited springy stiffness, having three-dimensionally deformed hollow columnar projections with open larger ends integral with said sheet and closed smaller ends to support a human body spaced outwardly from said sheet at least one-quarter inch, said projections tapering outwardly down to their smaller ends and having tapered upright ribs along their side walls, said projections of said pad portion being spaced apart by substantially more than the dimensions across their larger ends to permit substantially unobstructed flow of air therebetween and against the supported person, and said projections being integrally interconnected from front to rear and also from side to side of the pad, and being held against excess tilting by web portions of said same sheet between their larger ends and having a limited stiffness to normally hold said sheet generally flat.

10. The pad of claim 9, in which said projections are of progressively smaller height and size adjacent peripheral edges of said pad.

11. The pad of claim 9, having a plurality of similar such plastic sheets with their tapering hollow projections internested to provide a resilient action under load by the forcing of one projection farther into another to stretch it.

12. The pad of claim 9, having holes between said projections, and a second and generally flat plastic sheet against a face of the projection-carrying sheet, said second flat sheet having holes therethrough of substantially the same size as, and substantially vertically aligned with, said holes between said projections.

13. A flexible under-body ventilating pad for use on cushioned surfaces, comprising a thin sheet of plastic of limited stiffness shaped to support at least one person, said sheet having generally frusto-conical hollow columnar projections with slightly domed convex closed smaller ends and with side walls corrugated to form upright tapering ribs extending over into and tapering and merging into the domes of said smaller ends, all being three-dimensionally deformed from sheet for rigidity, with their larger ends coplanar and integral therewith, said projections being spaced apart in all directions by substantially more than the dimensions across their larger ends to permit substantially unobstructed flow of air therebetween and against the supported human body, said projections being interconnected in different directions, spaced and held against excess tilting by integral web portions of said sheet, said web portions being of limited stiffness to normally hold said sheet substantially flat, but being sufficiently bendable between said relatively rigid projections to flexibly conform to a supported person and with the deformations of a yieldable under cushion.

14. An under-body-ventilating flexible pad for use on cushioned surfaces and having hinged-together seat and back portions, each including as its main part a thin sheet of plastic of limited stiffness having generally frusto-pyramidal three-dimensionally-deformed embossed-type relatively rigid columnar projections substantially of said sheet thickness to spacedly support a human body, said projections being spaced apart in all lateral directions by substantially more than the dimension across their larger ends to permit relatively unobstructed flow of air therebetween and to the supported body, said projections being held against excess tilting and integrally interconnected in different directions by web portions of said same plastic sheet, said web portions being elongated, generally strip-like and extending both front to rear and side to side of the pad and being of a limited stiffness to normally hold said sheet substantially flat but flexible in simple bending across their lengths to conform locally and comfortably between said relatively rigid projections under a supported person and with the deformation of a seat cushion.

and margins free of said projections and wider than the larger ends of said projections about at least the exposed peripheral edges of each portion, said seat and back portions each having at least a foraminous flexible top cover extending out over said margins.

15. The pad of claim 14, in which said margins include an outer down-turned edge portion to hold the edges of said pad against curling up in use.

16. The pad of claim 14, in which said margins include an elongated rib portion generally parallel to, and spaced from, the inner portion of said margins and extending outwardly in the same direction as said projections.

17. A flexible under-body ventilating pad comprising a sheet of suitably non-brittle and strong plastic of from eight to twenty mils and of uniform thickness shaped to support at least one person, said sheet having a limited stiffness to normally hold itself generally flat and having generally frusto-conical hollow columnar projections with closed smaller ends three-dimensionally deformed from said sheet for rigidity with their larger ends coplanar and integral therewith, the areas of the smaller ends of said generally frusto-conical projections being in the order of from one-half to one-third of the areas of their larger ends and the heights of said projections being the same as the largest dimension across their small ends to resist collapse or bending in all directions, said projections being spaced apart in all directions by substantially more than the dimensions across their larger ends, with the area obstructed by said projections being only from one-tenth to one-third of the body-supporting area portions to permit substantially unobstructed flow of air between said projections and against the supported human body, said projections being interconnected in different directions, spaced and held against excess tilting by integral web portions of said sheet, said web portions being sufficiently bendable between said relatively rigid projections to flexibly conform to a supported person and with the deformations of a yieldable under-cushion.

18. A flexible under-body ventilating pad for use on automobile seats, comprising a thin sheet of suitably non-brittle and strong plastic shaped to support at least one person, said sheet having a limited stiffness to normally hold itself substantially flat and having generally frusto-conical hollow columnar projections three-dimensionally deformed from said sheet for rigidity with their larger ends coplanar and integral therewith, said projections being spaced apart in all directions by substantially more than the dimensions across their larger ends to permit substantially unobstructed flow of air therebetween and against the supported human body, said projections being interconnected in different directions, spaced and held against excess tilting by integral web portions of said sheet, said web portions being sufficiently bendable between said relatively rigid projections to flexibly conform to a supported person and with the deformations of a yieldable under cushion and said plastic sheet having less than about ten percent orientation to provide no material amount of locked-in orientation to be relieved by long exposure to temperatures such as those produced in a closed sun-heated parked automobile.

19. A flexible under-body ventilating pad comprising a thin sheet of suitably non-brittle and strong plastic shaped to support at least one person, said sheet having a limited stiffness to normally hold itself substantially flat and having generally frusto-conical hollow columnar projections three-dimensionally deformed from said sheet for rigidity with their larger ends coplanar and integral therewith and with all their upright side walls sloped at between ten and thirty degrees to the vertical and having tapering corrugations, said projections being spaced apart in all directions by substantially more than the dimensions across their larger ends to permit substantially unobstructed flow of air therebetween and against the supported human body, said projections being interconnected in different directions, spaced and held against excess tilting by integral web portions of said sheet, said web portions being sufficiently bendable between said relatively rigid projections to flexibly conform to a supported person and with the deformations of a yieldable under cushion.

20. A two-part flexible under-body ventilating pad of hinged-together seat and back portions for use on cushioned surfaces, consisting of a common one-piece thin sheet of suitably non-brittle and strong plastic shaped to support at least one person, said sheet having a limited stiffness to normally hold itself substantially flat and having generally frusto-conical hollow columnar projections three-dimensionally deformed from said sheet for rigidity with their larger ends coplanar and integral therewith, said projections being spaced apart in all directions by substantially more than the dimensions across their larger ends to permit substantially unobstructed flow of air therebetween and against the supported human body, said projections being interconnected in different directions, spaced and held against excess tilting by integral web portions of said sheet, said web portions being sufficiently bendable between said relatively rigid projections to flexibly conform to a supported person and with the deformations of a yieldable under cushion, said projections being in an area for said seat portion and in a spaced area for said back portions, and said one-piece plastic sheet having an integral flexure hinge strip between said areas.

21. An under-body ventilating pad unit including generally rectangular seat and back portions to support at least one person on a cushioned seat, said pad unit consisting of only a thin sheet of plastic having a limited springy stiffness to normally hold itself substantially flat, said sheet being integrally common to said two portions, being flexible in all directions to bend relatively freely under a supported body and down into an under-cushion, and having integral human-body supporting projections thereon spaced apart for air flow therebetween in all directions, in supporting areas for said seat and back portions shaped to support a human body, with said areas of projections being spaced apart to provide an integral hinge-forming portion of said plastic sheet which is the only hinge means in said unit aside from covers.

References Cited in the file of this patent

UNITED STATES PATENTS

| | | |
|---|---|---|
| 2,931,427 | Goldstein | Apr. 5, 1960 |
| 2,948,334 | Goldstein | Aug. 9, 1960 |
| 3,011,602 | Ensurd et al. | Dec. 5, 1961 |
| 3,050,749 | Crane et al. | Aug. 28, 1962 |
| 3,063,753 | Mitchell | Nov. 13, 1962 |

FOREIGN PATENTS

| | | |
|---|---|---|
| 876,086 | Great Britain | Aug. 30, 1961 |